United States Patent [19]
Maxwell

[11] 3,979,950
[45] Sept. 14, 1976

[54] BRAKE TESTING METHOD

[76] Inventor: Lloyd R. Maxwell, Bradford Hills, Downingtown, Pa. 19335

[22] Filed: Mar. 6, 1975

[21] Appl. No.: 555,813

[52] U.S. Cl. .................................................. 73/126
[51] Int. Cl.² .......................................... G01L 5/28
[58] Field of Search ............ 73/126, 123, 121, 117

[56] References Cited
UNITED STATES PATENTS

| | | | |
|---|---|---|---|
| 1,987,706 | 1/1935 | Prentiss | 73/126 |
| 3,554,024 | 6/1968 | Walker | 73/121 |
| 3,872,720 | 3/1975 | Fleagle et al. | 73/121 |

*Primary Examiner*—Jerry W. Myracle
*Attorney, Agent, or Firm*—Cushman, Darby & Cushman

[57] ABSTRACT

A method for dynamically testing the operation of a vehicle anti-skid brake system and for making a record thereof includes engaging a wheel of the vehicle with a rapidly rotating roller or the like and accurately measuring and recording changes in an appropriate operating characteristic of the wheel while the vehicle brakes are being fully applied with sufficient power to rapidly slow the roller to essentially zero rpm and simultaneously to cause the anti-skid system, if operating properly, to rapidly release and reapply brake force in a manner to cause the wheel speed to decrease in stepwise fashion. The rotating roller slips relative to the vehicle wheel during application of brake force so that the wheel will be accelerated by the roll during release of brake force.

17 Claims, 5 Drawing Figures

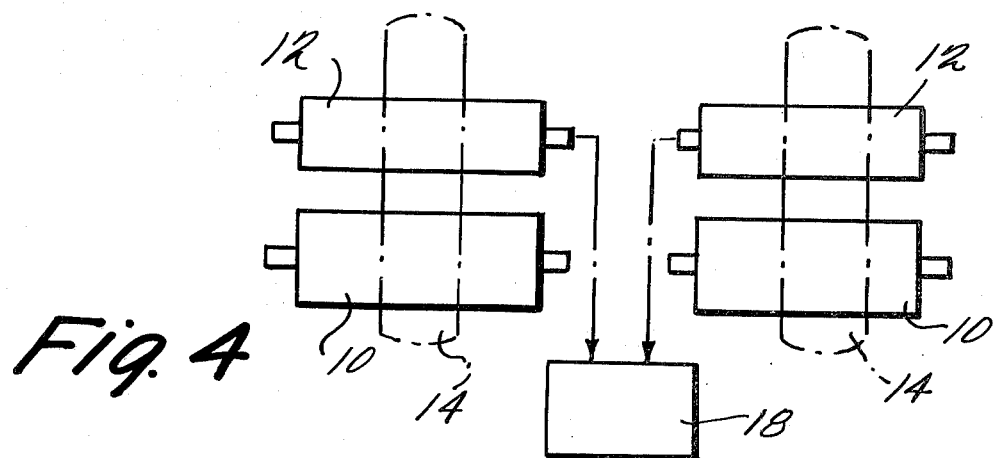
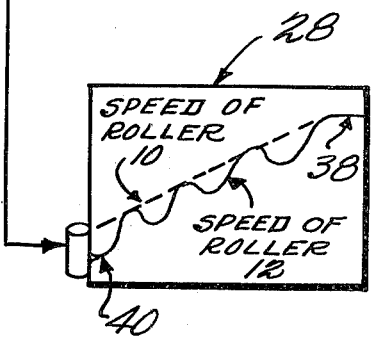
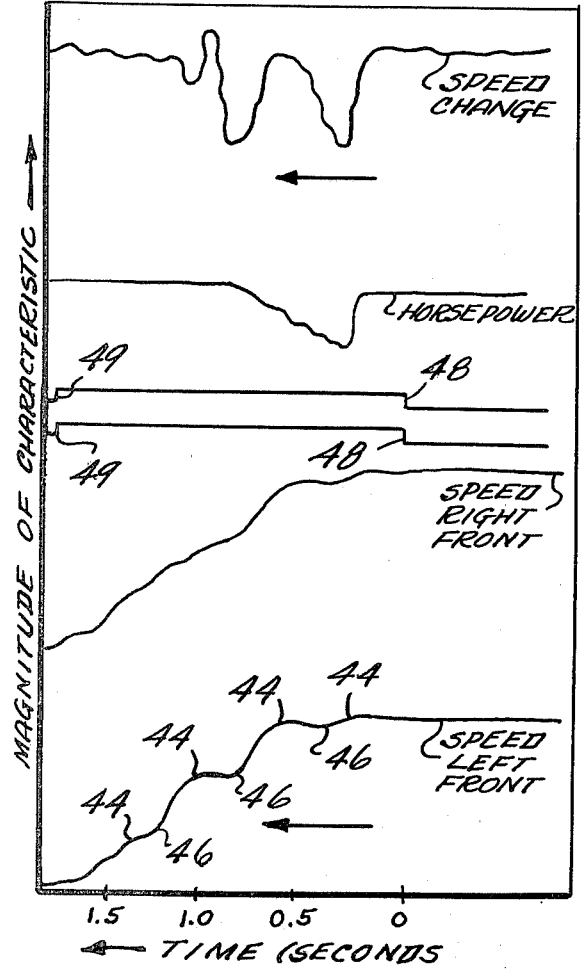
Fig. 4
Fig. 3

BRAKE TESTING METHOD

This invention relates to a system for the dynamic testing of anti-skid brake systems on motor vehicles and in particular to a method of employing a dynamometer for carrying out the test and for making a record of the test for future reference.

BACKGROUND AND GENERAL DESCRIPTION

Vehicle anti-skid brake systems, or computer brake systems or anti-wheel-lock systems as they are sometimes referred to, include a control feature which during operation in its normal mode, prevents the brakes from locking the vehicle wheels when the driver applies high foot pressure to the brake pedal of the vehicle. This function is accomplished, broadly, by causing the braking force to release just before a locked wheel condition occurs and to rapidly reapply braking force as soon as the potential of a locked condition disappears, even though the driver's foot continues to apply high pressure to the brake pedal throughout. The cycle of release and reapplication is very rapid, perhaps 300 to 500 milliseconds, and the cycle will normally be repeated a number of times while the vehicle is being decelerated. In general these brake systems include a sensor for sensing the speed of a vehicle wheel and for generating an electrical signal at least in part from the sensed wheel speed, the signal having a predetermined characteristic which varies with the wheel speed. When the signal indicates that the deceleration of the wheel is so great that locking of the wheel is imminent, a control circuit of the system operates to reduce the force which frictionally engages the elements of the brakes. Since at this time the vehicle is moving faster than the wheel, the wheel will now begin to accelerate. Many control systems sense this condition and cause the brake system to immediately reapply braking force. If the condition is not sensed a fail-safe circuit renders the control system inoperative.

The principles on which the above-summarized operational characteristics of anti-skid brake systems are based are well understood and accepted. It has long been realized, of course, that locked wheels on a moving vehicle do not decelerate the vehicle rapidly since the sliding friction between pavement and non-rotating tires does not absorb kinetic energy at a sufficiently high rate. It is generally accepted that deceleration of a vehicle is maximum when the linear speed of the vehicle wheels is 10% to 30% less than the speed of the vehicle, that is when the slip ratio lies between 10% and 30%, slip ratio being defined as $$\frac{VS-WS}{VS} \times 100$$

where VS is vehicle speed and WS is wheel speed. When a wheel is braked to the extent that its speed is more than 30% less than the vehicle speed, the sliding friction developed between tire and ground surface reduces traction to such an extent that the brakes inherently cause the wheel to lock. Therefore the broad object of any anti-skid brake system is to prevent too rapid deceleration of the wheels when the brakes are applied. In practice it is generally agreed that a wheel deceleration of more than about 1.25 g (g being the acceleration of gravity) leads rapidly to wheel lock-up and therefore many anti-skid systems employ this deceleration value in the generation of the brake-withdrawal signal.

The present invention is concerned with in-place testing of vehicles equipped with anti-skid brake systems under dynamic conditions to determine whether the brakes are properly controlled by the anti-skid system during continuous braking of the wheels from high speed to essentially zero speed. A dynamometer modified and operated according to the invention is a suitable machine for carrying out the test. Dynamometers have of course been used in the past to test various characteristics of the dynamic operation of brakes, but for reasons which will become apparent hereinafter the previously employed procedures and techniques are not capable of fully testing the operation of anti-skid systems. The present invention supplies this deficiency and at the same time provides a historical record which serves several important purposes. For example, by employing the dynamometer testing technique of the present invention a vehicle manufacturer can readily obtain, in a matter of minutes, a permanent visual test record for each vehicle establishing that the vehicle was delivered to the dealer with an anti-skid brake system in proper working order. This is highly desirable from the manufacturer's viewpoint because it establishes that the manufacturer has complied with whatever safety standards are required by law. The visual record may therefore be of considerable significance in placing liability in the event that the allegation is made later that an accident was caused by a faulty brake system. The same advantage is available to the dealer if he continues the record of a given vehicle by testing it when it is delivered to the customer. Similarly operators of fleets of trucks and busses can continue the record by including the test in their normal periodic safety inspections.

The testing procedure of the present invention makes use of the fact that an anti-skid brake control system during operation in its normal mode causes the vehicle wheels to slow down stepwise, as discussed briefly above. These alternate decelerations and accelerations of the wheel can be sensed by a dynamometer in any of several different modes of operation, when certain special controlled conditions are present, and the resulting electrical signals can be either preserved in a computer memory for subsequent printout or immediately converted to some convenient visual record. The instrumentation must of course accurately measure changes in the electrical signals occurring within very short time intervals, because anti-skid controls are capable of releasing and reapplying braking forces very rapidly. The electrical signals may be representative of any of the dynamic characteristics conventionally measured by a dynamometer, such as torque, wheel speed, wheel acceleration and deceleration, horsepower or balance (brake equalization). In all cases the electrical signal utilized by the present invention will vary with a change in the speed of the vehicle wheel. Either idler roll speed alone or drive roll alone or both in combination may be sensed directly for purposes of generating a signal indicative of speed, speed change, balance or horsepower. Even if the signal does not include a direct measurement of the speed of a roll the signal will still vary with vehicle wheel speed, as for example when a simple direct torque signal is employed, due to the operation of the anti-skid brake system.

Accordingly, it is the broad object of the invention to test a vehicle having an anti-skid brake system by simulating a high speed road condition for the vehicle with a dynamometer, strongly applying the vehicle brakes so as to drastically reduce the wheel speed to a low value in a very short time and at a rate which will activate the anti-skid system if the latter is in proper operating condition and obtaining a signal having a wheel-speed characteristic which indicates whether the wheel slowed down stepwise or became locked during the braking period.

A more specific object is to provide a method for testing vehicle-installed anti-skid systems by strongly braking a vehicle wheel against a motor-driven roll so as to cause slippage between the roll and the wheel, while obtaining the wheel-speed characteristic referred to above.

Another specific object is to provide a method for testing such anti-skid systems by strongly braking a vehicle wheel against a freely running roll which has sufficiently high inertia to cause slippage between the roll and the wheel during braking, while obtaining the wheel-speed characteristic referred to above.

DETAILED DESCRIPTION

In the drawings:

FIG. 3 is a portion of a strip chart illustrating the recordation of various signals produced by the testing system of FIG. 1; and FIG. 4 is a diagrammatic view of a second embodiment of a testing system.

Figure 1:
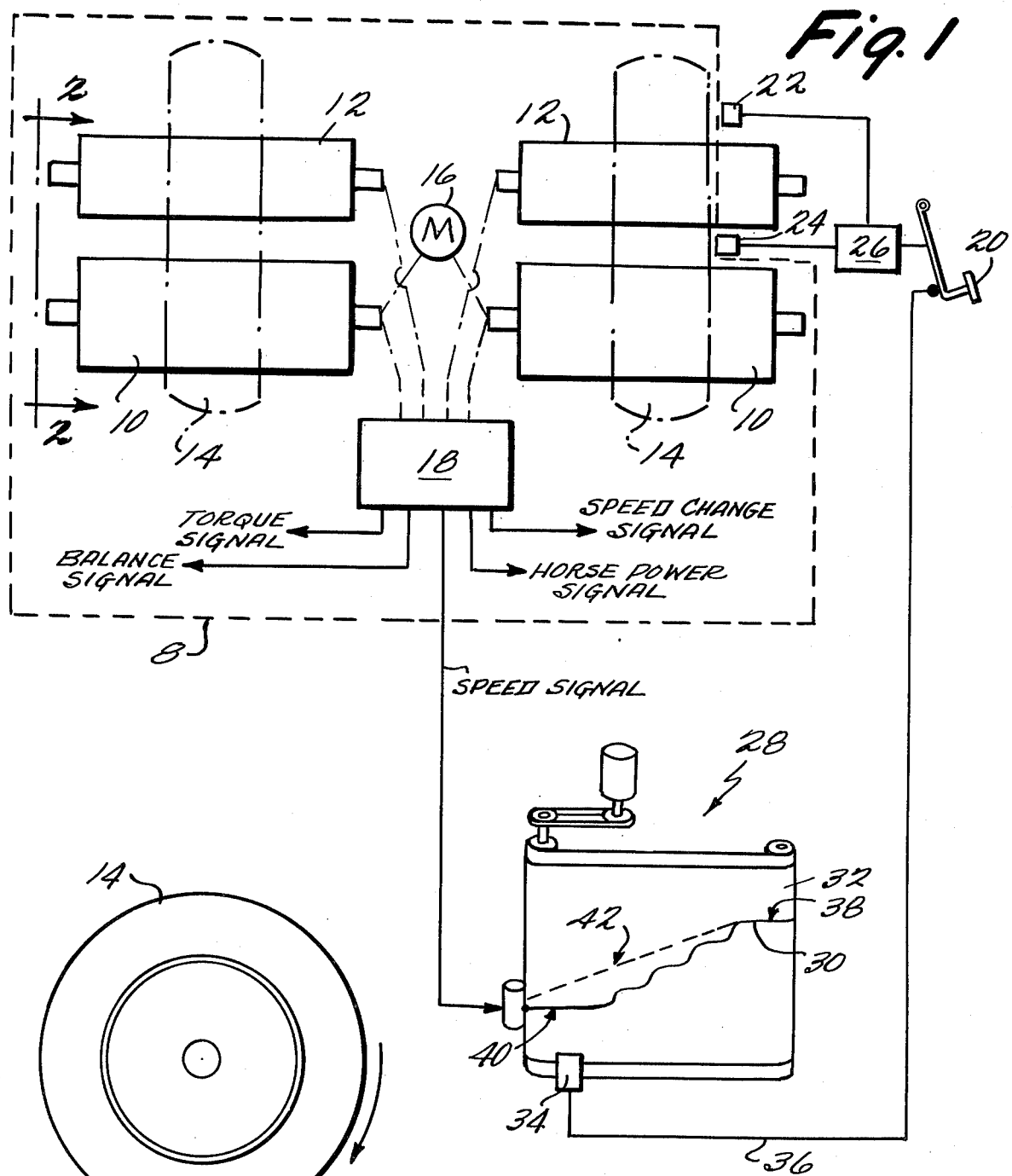
FIG. 1 is a diagrammatic view of an anti-skid brake testing system illustrating the principles of the present invention.

In order to fully test an anti-skid brake system which has been installed in a vehicle it is necessary to determine whether the system operates continuously on all braked wheels over essentially the entire speed range from the speed at which the driver applies the brakes down to essentially zero speed, i.e. about 10 mph with the brakes continuously applied. This can of course be accomplished during an actual road test by fitting each vehicle wheel with a speed sensor, providing suitable sensitive instrumentation, including for example a pen recorder to record the speed of each wheel versus time and rapidly braking the vehicle on a test pad from a speed of for example 60 mph to 10 mph. During braking the pen recorder produces a graph of wheel speed versus time. If the anti-skid control system has operated satisfactorily the graph will show that the wheel has slowed down stepwise, whereas if the wheel skidded, i.e. became locked the graph will show that wheel speed rapidly dropped to zero. The general shape of the stepwise curve is known and examples may be found in a number of patents, such as U.S. Pat. Nos. 3,467,443, 3,606,490 and 3,650,575. These patents are directed to anti-skid systems per se without regard to the testing thereof. The subject matter of these patents is incorporated herein by reference for the purpose of providing additional background information on the construction and operation of anti-skid systems.

Road testing of a vehicle to determine whether the anti-skid system is operating is of course rather time consuming in that it requires installation and removal of the test equipment for each vehicle and running the vehicle up to speed. In addition a large test area must be provided and if this is outside the road conditions will vary with weather conditions particularly in the event of rain or snow. Further, close repeatability of tests is mode difficult by the inability of the drivers to reach the same road speed for each vehicle, since the accuracy of dash speedometers is usually only within 5%.

Some dynamic brake testors employ dynamometer rolls for testing the brakes on a stationary vehicle. Such machines use an electric motor or motors to drive the rolls up to road speed, this in turn driving the vehicle wheels up to speed by engagement of the latter with the rolls. The motor drive is then disconnected from the rolls and the vehicle brakes are applied causing the wheels and rolls to decelerate. However, for purposes of testing anti-skid brakes this technique does not properly duplicate or simulate a road condition, because the rotating roll has no tendency to speed up the vehicle wheel after the anti-skid system first releases the brakes. As a result the anti-skid system deactivates itself because most such systems reapply brake force only after sensing a slight wheel acceleration, as referred to earlier.

The present invention overcomes this problem by using dynamometers in a manner not heretofore known and by making special modifications to dynamometers where required. The principles of electric dynamometers are well known and therefore do not require detailed discussion. The subject matter of U.S. Pat. Nos. 3,020,753 and 3,289,471 is incorporated herein by reference.

FIG. 1 illustrates in diagrammatic form a dynamometer system adapted for performing the method of the present invention. The dynamometer portion 8 of the system includes two driven rolls 10 each having a corresponding idler roll 12. These rolls are shown in plan view in FIG. 1 and as understood the vehicle wheels 14, either front wheels or back wheels, are cradled between a driven roll 10 and its idler roll 12 as shown in elevation in FIG. 2. The rolls 10 are driven by an electric motor 16 and instrumentation system 18 is provided for receiving various informations from the rolls 10 and from the motor 16. The instrumentation system 18 generates electrical signals which are representative of the usual dynamometer characteristics such as torque, horsepower, roll speed, roll acceleration or deceleration and balance (brake equalization). The dynamometer portion 8 may be conventional and may have for example the structure and operational characteristics of any of the machines and circuits disclosed in the aforesaid U.S. Pat. Nos. 3,020,753 and 3,289,471.

A typical anti-skid brake system installed in the vehicle being tested is illustrated schematically as including a brake pedal 20, a brake-applying device 22, such as an air cylinder or hydraulic cylinder, and a wheel acceleration and deceleration sensor 24. The elements 20, 22 and 24 cooperate with an anti-skid control device 26 in a conventional manner. That is, upon application of foot pressure to the pedal 20 the device 26 operates in response to a predetermined "potential wheel-lock" signal from the sensor 24 to release brake force being applied to the wheel 14 by the element 22 and in response to a subsequent slight acceleration of the wheel 14 to cause reapplication of brake force by the element 22. The other vehicle wheel is similarly connected to the control device 26 although for simplicity of illustration this is not illustrated.

In the illustrated embodiment the speed change signal from the dynamometer instrumentation system 18 is received by a strip chart pen recorder 28 which traces a line 30 on the moving graph paper 32 to form a graph of speed versus time. The recorder 28 includes an event indicator device 34 which marks the edge of the paper 32 when the brake pedal 20 is depressed and again when the pedal 20 is released. A control line 36 is provided for activating the device 34 from the brake pedal.

In operation of the FIG. 1 system the rolls 10 are driven by the motor 16 up to a typical high road speed equivalent to say 60 mph and power to the motor is maintained throughout the test. The vehicle wheels 14 are of course now rotating at the same peripheral speed as the rolls 10. A force is now applied to the brake pedal 20 in order to apply the vehicle brakes with sufficient force, i.e. full-on, to rapidly slow down the wheels 14 at a rate sufficient to cause operation of the anti-skid control 26 provided that the latter is in operating condition. The brakes are maintained full-on until the wheels and rolls come to essentially zero speed, for example equivalent to 10 mph. Electrical power to the motor 16 is automatically cut off at this latter speed to prevent damage to the motor 16. It is critical in this mode of operating the brake test that the motor be over-run by the vehicle brakes, because the motor and rolls 10 attempt to speed up the wheels 14 each time the control 26 releases brake force. As explained before the control 26 normally will deactivate itself after the first brake release unless the sensor 24 senses a slight acceleration after each deceleration. Without the motor drive in operation the control will deactivate and the wheels will lock-up.

The graph traced by the recorder 28 in FIG. 1 shows time in the horizontal direction and speed of the rolls 10 in the vertical direction, and it can be seen that there is a stepwise reduction in the speed of the driven rolls 10 during brake application, from a constant 60 mph speed illustrated at 38 to zero speed illustrated at 40. This establishes that the anti-skid control 26 operated throughout the range 60–0 mph. That is, each time the vehicle brakes were applied by the control 26 the speed of the rolls 10 decreased rapidly, and each time the brakes were released by the control 26 the speed of the rolls 10 increased slightly due to the motor drive. If the control 26 had not operated the brakes would have locked the wheels 14 and the speed rolls would have decreased rapidly in a continuous manner somewhat as indicated by the dash line 42.

It will be understood that the speed of the rolls 10 is analogous to the speed of the wheels 14 throughout the test. The peripheral speed of wheels 14 may be less than that of the rolls 10 but each time there is a decrease in wheel speed there will be a corresponding decrease in roll speed. Similarly each time there is an increase in roll speed there will be a corresponding increase in wheel speed. Therefore, measurement of roll speed is equivalent to measurement of wheel speed for purposes of the brake test. Since idler roll speed will correspond essentially to wheel speed, the speed of the idler rolls 12 may be traced by the recorder 28 if desired. The recorder 28 is of course merely one example of a device capable making a historical record of the brake test.

Figure 2:
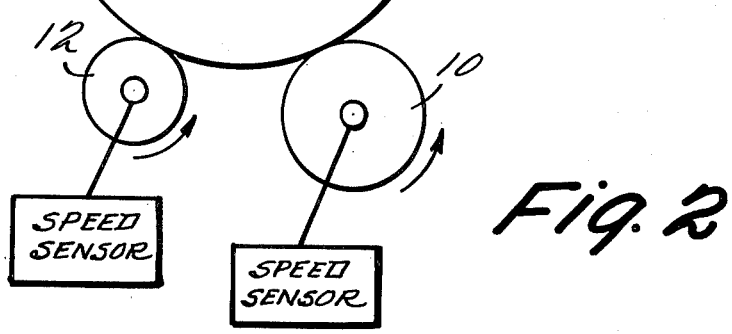
FIG. 2 is a diagrammatic view taken on the line 2—2 of FIG. 1.

FIG. 3 is a reproduction of actual strip recording charts made with the system illustrated schematically in FIGS. 1 and 2. In this case the instrumentation system 18 of the dynamometer portion 8 of the testing apparatus was connected to four pens so as to record roll speed for each of the rolls 10, horsepower being generated by the brake system and speed change of one of the rolls 10. The two speed graphs are shown in the lower portion of the figure wherein it can readily be seen that control 26 applied the brakes at points 44 and released the brakes at points 46. The event mark 48 indicates the time of first application of a force to the brake pedal 20, and the event mark 49 indicates the removal of the force on the pedal. These marks are common to all four curves. The horsepower curve in the center of the curve shows an initial rapid increase and then a stepwise decrease. The speed change curve at the top of the figure shows alternate increases and decreases. The characteristic shape of any of these curves, or of other curves derived from the system 18, may be utilized to show whether the anti-skid control 26 has operated.

A different mode of brake testing is shown in FIG. 4. In this mode the rolls 10 are not motor driven during the test although they are initially driven up to speed by motors or by the vehicle wheels. Here, however, the rolls 10 have been modified to have high inertia relative to the inertia of the wheels 14 and this results in slippage between the rolls 10 and wheels 14 when the brakes are applied strongly. The idler rolls 12 which have relatively low inertia follow the speed of the wheels 14 and therefore in this embodiment it is necessary to sense the speed of the rolls 12 not the rolls 10. The graph of speed versus time takes the same form as in FIG. 1 when the control 26 operates properly.

What is claimed is:

1. A method for testing an anti-skid brake system installed in a wheeled vehicle, said brake system including a driver-actuated brake pedal and a control system which in the normal operating mode prevents lock-up of the vehicle wheels during braking by releasing brake force in response to the sensing of a condition of a wheel indicative of imminent lock-up and by rapidly reapplying brake force in response to the disappearance of the condition, said method comprising: engaging the periphery of the wheel with a motor-driven roll; driving the roll up to a high speed corresponding to a typical high vehicle road speed thereby driving the wheel at a simulated high road speed; maintaining the motor drive to the wheel while actuating the vehicle brakes sufficient to decelerate the wheel relative to said driven roll to produce said condition which is indicative of wheel-lock-up to permit said control system, if operating in its normal mode, to repeatedly release and reapply brake force whereby said wheel and said roll under the influence of the motor drive will tend to accelerate during periods of released brake force; continuing to actuate the brakes to decelerate the wheel and roll, thereby overriding the motor in the aforesaid stepwise manner until a low simulated road speed of the vehicle wheel is reached; and generating a signal which varies with changes in the speed of the wheel whereby said singal indicates whether said control system has operated in its normal mode during the braking step.

2. A method as in claim 1 wherein the step of generating the signal includes sensing the speed of the roll.

3. A method as in claim 1 including the step of converting said signal to a historical record representing said signal versus time during the braking step.

4. A method for testing an anti-skid brake system installed in a wheeled vehicle, said brake system including a driver-actuated brake pedal and a control system which in the normal operating mode prevents lock-up of the vehicle wheels during braking by releasing brake force in response to the sensing of a condition of the wheel indicative of imminent lock-up and by rapidly reapplying brake force in response to the disappearance of the condition, said method comprising: engaging the periphery of a wheel of the vehicle with the periphery of a roll; driving the roll up to a high speed corresponding to a typical high vehicle road speed to thereby rotate the wheel at high speed; releasing the roll from the driving force; strongly applying the vehicle brakes while maintaining said force for a time period sufficient to rapidly decelerate the wheel and the roll to essentially zero speed, the inertia of the roll relative to the inertia of the wheel being sufficiently high that slippage occurs therebetween as the wheel rotates at a lower peripheral linear speed than the roll; continuously sensing the speed of the wheel; and generating a signal at least in part from the sensed speed of the wheel, said signal having a predetermined characteristic which varies with said speed whereby said signal indicates whether said control system has operated in its normal operating mode during said time period.

5. A method as in claim 4 including the step of engaging the periphery of the wheel with the periphery of an idler roll during said time period, the inertia of the idler roll relative to the wheel being sufficiently low that no significant slippage occurs therebetween during braking, and wherein the step of continuously sensing the speed of the wheel includes sensing the speed of the idler roll.

6. A method as in claim 4 including the step of converting said electrical signal to a historical record representing said signal versus time during said time period.

7. A method for testing an anti-skid brake system installed in a wheeled vehicle, said brake system including a driver-actuated brake pedal and a control system which in the normal operating mode prevents lock-up of a vehicle wheel during braking by releasing brake force in response to the sensing of a condition of a wheel indicative of imminent lock-up and by rapidly reapplying brake force in response to the disappearance of the condition, said method comprising: engaging the periphery of the wheel with a roll which is rotating at a peripheral linear speed simulating a high road speed and thereby driving the wheel at the same peripheral linear speed; strongly applying the brakes to the wheel, with sufficient force to effect slippage between the wheel and the roll and with sufficient force to produce said wheel condition and to place the brake control system, if operating, in its normal operating mode, whereby during periods of brake release the wheel will be accelerated by the rotating roll and thereby cause said wheel condition to disappear; continuously generating a signal which varies with changes in the speed of the wheel whereby the signal indicates whether the control system has operated in its normal mode; and continuing to maintain actuation of the brake system and continuing to generate said signal until the roll and wheel speed decrease substantially.

8. A method as in claim 7 wherein the brakes are applied for a period sufficient to decrease the peripheral linear speed of the wheel and the roll to about 10 miles per hour.

9. A method as in claim 7 wherein said roll is motor-driven throughout the time period during which the brakes are applied and wherein during this period the drive motor is overridden and decelerated by the brakes by virtue of the engagement of the wheel with the roll.

10. A method as in claim 9 wherein the step of generating the signal includes sensing the speed of the roll.

11. A method as in claim 9 including the step of converting said signal to a historical record representing said signal versus time during the braking step.

12. A method as in claim 9 wherein the brakes are applied for a period sufficient to decrease the peripheral linear speed of the wheel and the roll to about 10 miles per hour.

13. A method as in claim 12 wherein the motor drive is disconnected from the roll when the latter reaches the peripheral linear speed of about 10 miles an hour.

14. A method as in claim 7 wherein during application of the brakes the roll is freely running, the inertia of the roll relative to the inertia of the wheel being sufficiently high to produce said slippage between the wheel and the roll when the brakes are applied and sufficiently high to accelerate the wheel when the brakes are released during operation of the brake control system in its normal mode.

15. A method as in claim 14 wherein the brakes are applied for a period sufficient to decrease the peripheral linear speed of the wheel and the roll to about 10 miles per hour.

16. A method as in claim 14 including the step of engaging the periphery of the wheel with the periphery of an idler roll during application of the brakes, the inertia of the idler roll relative to the wheel being sufficiently low that no significant slippage occurs therebetween during braking, and wherein the step of continuously sensing the speed of the wheel includes sensing the speed of the idler roll.

17. A method as in claim 14 including the step of converting said signal to a historical record representing said signal versus time during said time period.

* * * * *